US012732958B2

(12) United States Patent
Ke

(10) Patent No.: US 12,732,958 B2
(45) Date of Patent: Sep. 8, 2026

(54) INFORMATION PROCESSING METHOD AND APPARATUS, COMMUNICATION DEVICE AND READABLE STORAGE MEDIUM

(71) Applicant: VIVO MOBILE COMMUNICATION CO., LTD., Dongguan (CN)

(72) Inventor: Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 228 days.

(21) Appl. No.: 18/386,594

(22) Filed: Nov. 2, 2023

(65) Prior Publication Data

US 2024/0064702 A1 Feb. 22, 2024

Related U.S. Application Data

(63) Continuation of application No. PCT/CN2022/091433, filed on May 7, 2022.

(30) Foreign Application Priority Data

May 7, 2021 (CN) ........................ 202110497404.6

(51) Int. Cl.
*H04W 68/02* (2009.01)
*H04W 76/30* (2018.01)

(52) U.S. Cl.
CPC ........... *H04W 68/02* (2013.01); *H04W 76/30* (2018.02)

(58) Field of Classification Search
CPC ..... H04W 68/02; H04W 76/30; H04W 76/25; H04W 76/27; H04W 60/00; H04W 68/00
See application file for complete search history.

(56) References Cited

U.S. PATENT DOCUMENTS

| | | | | |
|---|---|---|---|---|
| 11,184,791 | B2 * | 11/2021 | Kim | H04W 48/04 |
| 2022/0394667 | A1 * | 12/2022 | Berggren | H04W 52/0216 |
| 2023/0156659 | A1 * | 5/2023 | Li | H04W 68/02 455/458 |

FOREIGN PATENT DOCUMENTS

| | | | |
|---|---|---|---|
| CN | 111278107 | A | 6/2020 |
| WO | 2020185949 | A2 | 9/2020 |
| WO | 2021066562 | A1 | 4/2021 |

OTHER PUBLICATIONS

Soltani, Sanaz, et al. “Intelligent control in 6G open RAN: Security risk or opportunity ?. ” IEEE Open Journal of the Communications Society 6 (2025): 840-880. (Year: 2025).*

International Search Report issued in corresponding International Application No. PCT/CN2022/091433, mailed Jun. 24, 2022, 6 pages.

Ericsson et al, “Function Description for Multi-SIM devices”, 3GPP TSG-SA2 Meeting # 144E (e-meeting), S2-2102170, Apr. 2021, 8 pages.

(Continued)

*Primary Examiner* — Sharad Rampuria
(74) *Attorney, Agent, or Firm* — IPX PLLC

(57) ABSTRACT

An information processing method is provided. The information processing method includes: when the first condition is met, sending, to a terminal, information indicating that the paging restriction function is supported. The first condition includes at least one of the following: that the terminal supports a paging restriction function; or that the network supports a paging restriction function.

20 Claims, 5 Drawing Sheets

(56) References Cited

OTHER PUBLICATIONS

Apple, “Leaving procedure for Multi-USIM UEs”, 3GPP TSG-CT WG1 Meeting #129-e, C1-212381, Apr. 2021, 34 pages.
Nokia et al, “KI#2: New solution: Resolving paging conflict using MUSIM Assistance Information.”, SA WG2 Meeting #139E, S2-2003766, Jun. 2020, 5 pages.

* cited by examiner

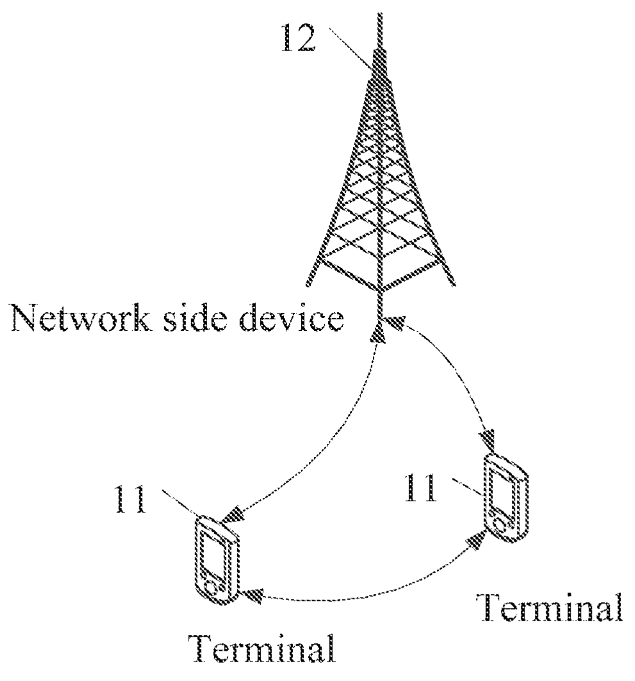

FIG. 1

21: In a case that a first condition is met, send, to a terminal, information indicating that a paging restriction function is supported

FIG. 2

31: Receive information indicating paging rejection or information indicating a request to leave a network 32: According to the information indicating paging rejection or the information indicating a request to leave a network, send, to an RAN network element, information indicating a request to release to a disconnected state

FIG. 3

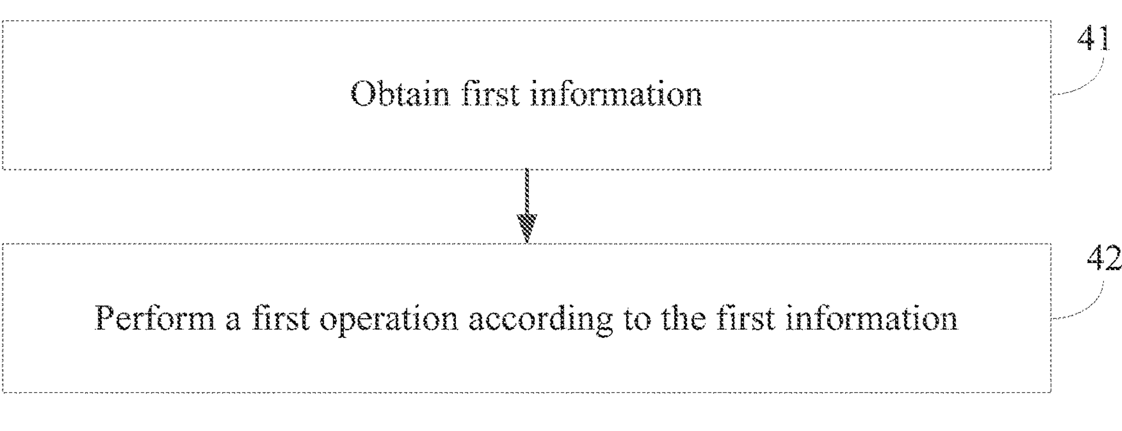
FIG. 4
In a case that a second condition is met, perform a second operation
51
FIG. 5
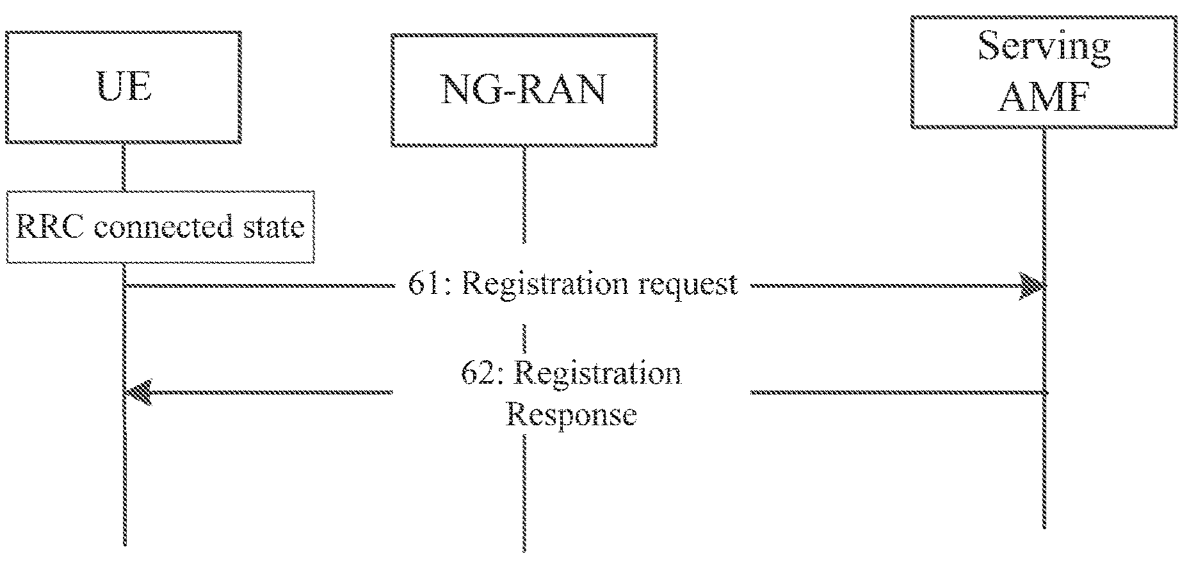
FIG. 6

INFORMATION PROCESSING METHOD AND APPARATUS, COMMUNICATION DEVICE AND READABLE STORAGE MEDIUM

CROSS-REFERENCE TO RELATED APPLICATIONS

The present application is a continuation of International Application No. PCT/CN2022/091433, filed on May 7, 2022, which claims priority to Chinese Patent Application No. 202110497404.6, filed on May 7, 2021. The entire contents of each of the above-referenced applications are expressly incorporated herein by reference.

TECHNICAL FIELD

The present application belongs to the technical field of communication, and in particular relates to an information processing method and apparatus, a communication device and a readable storage medium.

BACKGROUND

In an existing network, a multi-card terminal is more and more commonly used, and a multi-card terminal may have two or more than two Subscriber Identity Module (SIM) cards. For multi-card terminals, the Paging Restriction (PR) function is currently introduced to improve the performance of multi-card terminals. However, it is currently not clear how to indicate the paging restriction function.

SUMMARY

Embodiments of the present application provide an information processing method and apparatus, a communication device, and a readable storage medium.

According to a first aspect, an information processing method is provided, which is applied to a first communication device, including:

in a case that a first condition is met, sending, to a terminal, information indicating that a paging restriction function is supported;

where the first condition includes at least one of the following:

the terminal supports the paging restriction function; and a network supports the paging restriction function.

According to a second aspect, an information processing method is provided, which is applied to a second communication device, including:

receiving information indicating paging rejection or information indicating a request to leave a network; and according to the information indicating paging rejection or the information indicating a request to leave a network, sending, to a Radio Access Network (RAN) network element, information indicating a request to release to a disconnected state.

According to a third aspect, an information processing method is provided, which is applied to a third communication device, including:

obtaining first information; and performing a first operation based on the first information, where the first operation includes at least one of the following:

sending information indicating that a second function is not supported; and sending indication information indicating not sending a paging cause;

where the first information is used to indicate at least one of the following: the terminal enters a single-card mode, the terminal exits the multi-card mode, the terminal does not support a first function, and the terminal does not request or does not need the first function;

where the first function includes at least one of the following: a paging rejection function, a paging restriction function, a paging cause function, a network leaving function, and a paging conflict avoidance function, the second function includes at least one of the following: a paging rejection function, a paging restriction function, a paging cause function, a network leaving function, and a paging conflict avoidance function; and the second function is the same as or different from the first function.

According to a fourth aspect, an information processing method is provided, which is applied to a fourth communication device, including:

in a case that a second condition is met, performing a second operation;

where the second operation includes at least one of the following:

setting a first function as not being supported;

setting a multi-card mode to a single-card mode, or exiting the multi-card mode;

setting the first information; and sending first information, where the first information is used to indicate at least one of the following: the terminal enters a single-card mode, the terminal exits the multi-card mode, the terminal does not support a first function, and the terminal does not request or does not need the first function; and the first function includes at least one of the following: a paging rejection function, a paging restriction function, a paging cause function, a network leaving function, and a paging conflict avoidance function.

According to a fifth aspect, an information processing apparatus is provided, which is applied to a first communication device, including:

a first sending module, configured to: in a case that a first condition is met, send, to a terminal, information indicating that a paging restriction function is supported, where the first condition includes at least one of the following:

the terminal supports the paging restriction function; and a network supports the paging restriction function.

According to a sixth aspect, an information processing apparatus is provided, which is applied to a second communication device, including:

a first receiving module, configured to receive information indicating paging rejection or information indicating a request to leave a network; and a second sending module, configured to: according to the information indicating paging rejection or the information indicating a request to leave a network, send, to an RAN network element, information indicating a request to release to a disconnected state.

According to a seventh aspect, an information processing apparatus is provided, which is applied to a third communication device, including:

an obtaining module, configured to obtain first information, and a first execution module, configured to perform a first operation based on the first information, where the first operation includes at least one of the following:

sending information indicating that a second function is not supported; and sending indication information indicating not sending a paging cause;

where the first information is used to indicate at least one of the following: the terminal enters a single-card mode, the terminal exits the multi-card mode, the terminal does not support a first function, and the terminal does not request or does not need the first function; and where the first function includes at least one of the following: a paging rejection function, a paging restriction function, a paging cause function, a network leaving function, and a paging conflict avoidance function;

the second function includes at least one of the following: a paging rejection function, a paging restriction function, a paging cause function, a network leaving function, and a paging conflict avoidance function; and the second function is the same as or different from the first function.

According to an eighth aspect, an information processing apparatus is provided, which is applied to a fourth communication device, including:

a second execution module, configured to: in a case that a second condition is met, perform a second operation;

where the second operation includes at least one of the following:

setting a first function as not being supported;

setting a multi-card mode to a single-card mode, or exiting the multi-card mode;

setting the first information; and sending first information, where where the first information is used to indicate at least one of the following: the terminal enters a single-card mode, the terminal exits the multi-card mode, the terminal does not support a first function, and the terminal does not request or does not need the first function; and the first function includes at least one of the following: a paging rejection function, a paging restriction function, a paging cause function, a network leaving function, and a paging conflict avoidance function.

In a ninth aspect, a communication device is provided, including a processor, a memory, and a program or an instruction stored in the memory and executable on the processor, and when the program or the instruction is executed by the processor, the steps of the method according to the first aspect, the steps of the method according to the second aspect, or the steps of the method according to the third aspect or the steps of the method according to the fourth aspect are implemented.

According to a tenth aspect, a readable storage medium is provided, where the readable storage medium stores a program or an instruction, and when the program or the instruction is executed by a processor, the steps of the method according to the first aspect, the steps of the method according to the second aspect, or the steps of the method according to the third aspect of the steps of the method according to the fourth aspect are implemented.

According to an eleventh aspect, a chip is provided, where the chip includes a processor and a communication interface, the communication interface is coupled to the processor, and the processor is used to run programs or instructions, so as to implement the steps of the method according to the first aspect, the steps of the method according to the second aspect, or the steps of the method according to the third aspect or the steps of the method according to the fourth aspect.

According to a twelfth aspect, a computer program/program product is provided, stored in a non-transient storage medium, the program/program product is executed by at least one processor to implement the steps of the method according to the first aspect, the steps of the method according to the second aspect, or the steps of the method according to the third aspect or the steps of the method according to the fourth aspect.

In this embodiment of the present application, when the first condition is satisfied, an Access Management Function (AMF) may send, to the terminal, information indicating that the paging restriction function is supported, so as to realize the indication of supporting the paging restriction function.

BRIEF DESCRIPTION OF DRAWINGS

FIG. 1 is a block diagram of a wireless communication system according to some embodiments of the present application;

FIG. 2 is a schematic flowchart of an information processing method according to an embodiment of the present application;

FIG. 3 is a schematic flowchart of another information processing method according to an embodiment of the present application, FIG. 4 is a schematic flowchart of another information processing method according to an embodiment of the present application;

FIG. 5 is a schematic flowchart of another information processing method according to an embodiment of the present application, FIG. 6 is a schematic flowchart of an information processing method in application scenario 1 of an embodiment of the present application;

DETAILED DESCRIPTION

Figure 7:
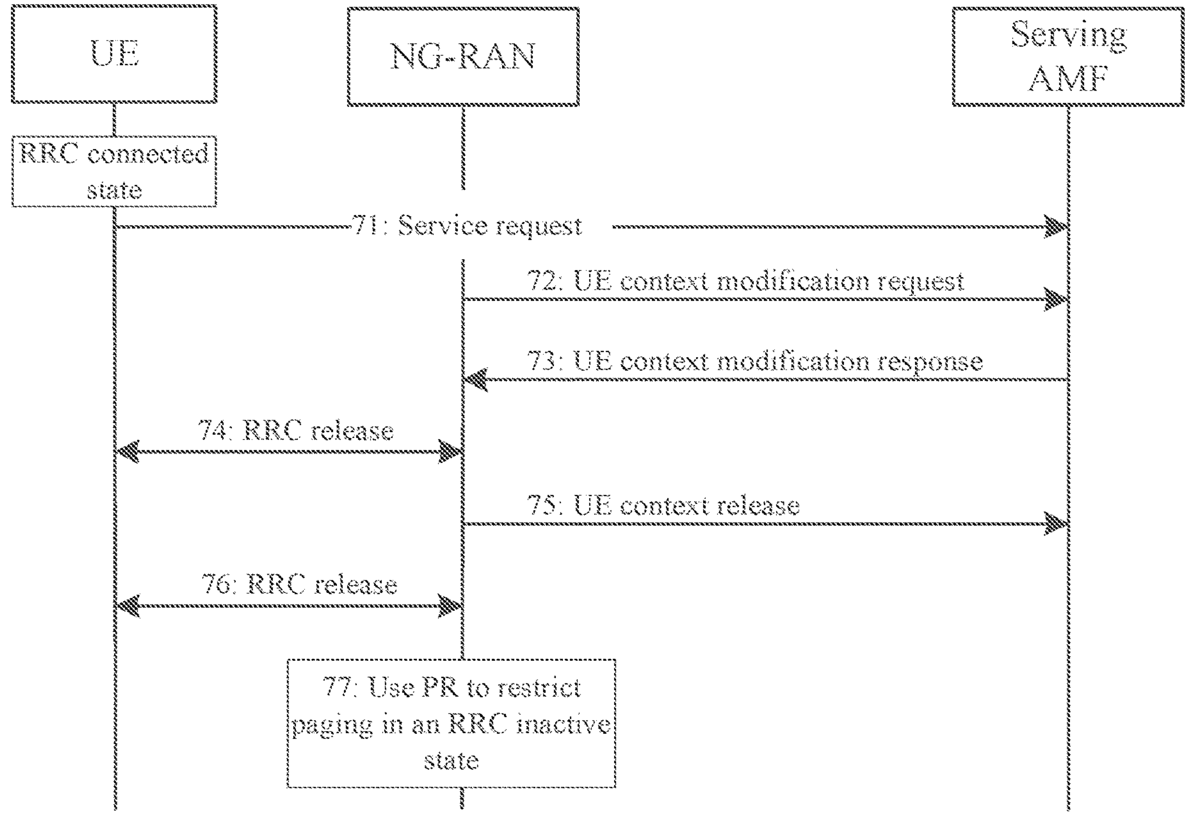
FIG. 7 is a schematic flowchart of an information processing method in application scenario 2 of an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application shall fall within the protection scope of the present application.

The terms "first", "second", and the like in this specification and claims of the present application are used to distinguish between similar objects instead of describing a specific order or sequence. It should be understood that, the terms used in such a way is interchangeable in proper circumstances, so that the embodiments of the present application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

FIG. 1 is a block diagram of a wireless communication system to which embodiments of the present application can be applied. The wireless communications system includes a terminal 11 and a network side device 12. The terminal 11 may also be called a terminal device or a User Equipment (UE), and the terminal 11 may be a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or a Vehicle User Equipment (VUE), a Pedestrian User Equipment (PUE), and other terminal side devices. The wearable device includes: smart watches, bracelets, earphones, glasses, etc. It should be noted that a specific type of the terminal 11 is not limited in the embodiments of the present application. The network side device 12 may be a base station or a core network. The base station may be referred to as a node B, an evolved node B, an access point, a Base Transceiver Station (BTS), a radio base station, a radio transceiver, a Basic Service Set (BSS), an Extended Service Set (ESS), a node B, an evolved Node B (eNB), a home node B, a home evolved node B, a WLAN access point, a WiFi node, a Transmission and Reception Point (TRP), or other appropriate terms in the art. As long as a same technical effect is achieved, the base station is not limited to a specified technical term.

In an embodiment of the present application, "being capable of" can represent at least one of the following: allowed, supported, tend, and preferentially have the ability. "Not being capable of" can represent at least one of the following: not allowed, not supported, not allowed, not intend, and have no ability.

In an embodiment of the present application, obtaining or acquiring may be understood as obtaining from a configuration, obtaining through receiving, obtaining after receiving by using a request, obtaining through self-learning, obtaining through derivation based on information that is not received, or obtaining after processing based on received information. This may be determined based on an actual requirement, and is not limited in the embodiments of the present application. For example, when indication information of a capability sent by a device is not received, it may be deduced that the device does not support the capability.

In an embodiment of the present application, sending may include broadcasting, broadcasting in a system message, and returning after responding to a request.

In an embodiment of the present application, "separately" and "independently" may represent the same meaning and may be used in combination.

In an embodiment of the present application, the voice service may include an Internet Protocol (IP) Multimedia Subsystem (IMS) voice service. The IMS voice service may include at least one of the following: an IMS voice service through a 3rd Generation Partnership Project (3GPP) and an IMS voice service through a non-3GPP.

In an embodiment of the present application, a communications device may include at least one of the following: a communications network element and a terminal.

In an embodiment of the present application, a communications network element may include at least one of the following: a core network network element and a radio access network network element.

In an embodiment of the present application, the Core Network (CN) network element may include, but is not limited to, at least one of the following a core network device, a core network node, a core network function, a Mobility Management Entity (MME), an AMF), a Session Management Function (SMF), a User Plane Function (UPF), a Serving Gateway (SGW), a Packet Data Network (PDN) gateway, a Policy Control Function (PCF), a Policy and Charging Rules Function (PCRF) unit, a Serving General Packet Radio Service (GPRS) Support Node (SGSN), a Gateway GPRS Support Node (GGSN), a Unified Data Management (UDM), a Unified Data Repository (UDR), a Home Subscriber Server (HSS), and an Application Function (AF).

In an embodiment of the present application, an RAN network element may include, but is not limited to, at least one of the following: a radio access network device, a radio access network node, a radio access network function, a radio access network unit, a 3GPP radio access network, a non-3GPP radio access network, a Centralized Unit (CU), a Distributed Unit (DU), a base station, an eNB, a 5G Base station (gNB), a Radio Network Controller (RNC), a NodeB, a Non-3GPP Inter Working Function (N3IWF), an Access Controller (AC) node, an Access Point (AP) device, and a Wireless Local Area Networks (WLAN) node.

In an embodiment of the present application, the MUSIM capability may also be called the first function. The first function may include at least one of the following: a paging rejection function, a paging restriction function, a paging cause function, a network leaving function, and a paging conflict avoidance function.

In an embodiment of the present application, the network is a mobile communication network.

In order to facilitate the understanding of the embodiments of the present application, the following terms are first explained:

1. Multi-Card Mode

In an embodiment of the present application, the multi-card mode may include at least one of the following the terminal is loaded with multiple SIMs (including a Universal Subscriber Identity Module (USIM)), and the terminal requests at least one first function from the network, and the terminal supports at least one first function. The first function includes at least one of the following: a paging rejection function, a paging restriction function, a paging cause function, a network leaving function, and a paging conflict avoidance function. The first function may also be called Multi-USIM function.

2. Disconnected State and Inactive State

In an embodiment of the present application, the disconnected state may include at least one of the following: an idle state and an inactive state.

In an embodiment of the present application, the inactive state includes a Radio Resource Control (RRC) inactive state. The idle state includes at least one of the following: an RRC idle state and a Connection Management (CM) idle state.

In an embodiment of the present application, the connection between the terminal and the network includes at least one of the following: RRC connection and NAS connection.

3. Paging Cause Function

In an embodiment of the present application, the paging message includes at least one of the following: an air interface (Uu interface) paging message; and a notification message in a NAS message.

In an embodiment of the present application, the paging message includes related information used to indicate a paging cause. In an embodiment, the related information used to indicate the paging cause includes at least one of the following: a number of terminals indicating that the paging cause is a first value, a number of terminals indicating that the paging cause is a second value, and a bit sequence indicating that the paging cause is a first value and/or a second value.

In an embodiment of the present application, the RAN paging is a paging initiated by the RAN, for example, a paging message initiated by a terminal in an RRC inactive state.

In an embodiment of the present application, the paging cause at least supports voice.

In an embodiment of the present application, the fact that the paging cause is unknown means that the cause of triggering the paging is unclear or whether the data is voice or non-voice is unclear.

In an embodiment of the present application, the paging cause is a type of data that triggers paging. The type of data includes a data service type. In some embodiments, the type of service and/or data may be reflected in the paging cause in the paging message and the notification type information in the notification message. The type of service and/or data may be the type of service and/or data on the network side. The type of data includes the type of the service to which the data belongs, and the type of the data itself (such as control plane signaling).

(1) In an embodiment of the present application, that the network supports the paging cause function includes at least one of the following:

the network supports determining a type of data;

the network supports adding the type of data to a terminal-related paging request message and/or paging message as a paging cause; and the network supports determining whether to add paging cause-related information (such as Information Element (IE)) to the paging message according to the type of data;

where the data is at least one of the following: data that triggers paging of the terminal, and received or generated data about the terminal.

(2) In an embodiment of the present application, that the CN network element of the network supports the paging cause function includes at least one of the following:

the CN network element of the network supports determining a type of data, and sending the type of data to the terminal as a paging cause, and the CN network element of the network supports determining whether to add paging cause-related information (such as IE) to the paging message according to the type of data:

where the data is at least one of the following: data that triggers paging of the terminal, and received or generated data about the terminal.

(3) In an embodiment of the present application, that the RAN network element of the network supports the paging cause function includes at least one of the following:

the RAN network element of the network supports understanding paging cause-related information in a paging request message triggered by the CN network element;

the RAN network element of the network supports adding the paging cause-related information to a paging message of an air interface;

the RAN network element of the network supports determining a type of data for a terminal in an inactive state;

for a terminal in an inactive state, the RAN network element of the network supports determining, according to the type of data, a cause for triggering paging of the terminal;

the RAN network element of the network supports determining whether to add paging cause-related information (such as IE) to the paging message according to the type of data or the determined paging cause; and the RAN network element of the network supports adding the type of data to a terminal-related paging message as a paging cause or adding the determined paging cause to a terminal-related paging message;

where the data is at least one of the following: data that triggers paging of the terminal, and received or generated data about the terminal.

In an implementation manner, only when the paging cause is determined to be the first value, the determined paging cause is included in the terminal-related paging message.

(4) In an embodiment of the present application, that the terminal supports the paging cause function includes at least one of the following: the network supports understanding the value of the paging cause, and the network supports determining the type of data, where the data is at least one of the following: data that triggers the paging of the terminal.

In an embodiment of the present application, the first value includes at least one of the following: voice, short message, IMS signaling, control plane signaling, and system message change.

In an embodiment of the present application, the second value includes one of the following: non-voice, other values outside the value range of the first value, and other paging causes that trigger paging outside the value range of the first value.

In an embodiment of the present application, the value range of the first value includes at least one of the following: voice, short message, IMS signaling, and control plane signaling.

In some embodiments, the first value is one or more items in the value range of the first value.

In example 1, the value range of the first value may include X, Y, and Z. Then, the second value can be other paging causes that trigger paging other than X, Y and Z.

(1) In an implementation manner, if the cause for triggering paging or the type of data for triggering paging is X; the first value is X.

(2) In another implementation manner, if the cause for triggering paging or the type of data for triggering paging is X and Y, the first value is X and Y.

(3) In another implementation manner, if the cause for triggering paging or the type of data for triggering paging is A, the cause for triggering paging is the second value.

In example 2, the value range of the first value may be X. Then, the second value may be a value other than X.

(1) In an implementation manner, if the cause for triggering paging or the type of data for triggering paging is X; the first value received by the terminal is X.

(2) In another implementation manner, if the cause for triggering paging or the type of data for triggering paging is X and Y, the cause for paging is one of the following: the first value (namely X), and the first value and/or the second value.

(3) In another implementation manner, if the cause for triggering paging or the type of data for triggering paging is Y, the cause for paging is the second value.

In an embodiment of the present application, the type of data includes but is not limited to at least one of the following: control plane signaling (such as NAS signaling), user plane data, and a service type to which the data belongs. The control plane signaling may include but is not limited to at least one of the following: CN location update.

In an embodiment of the present application, the type of service and/or data may include but is not limited to at least one of the following: IMS, IMS voice service, Location Service (LCS), short message, control plane signaling (such as CN location update), IMS signaling (such as IMS periodic report), paging reception, RAN notification, paging rejection response (such as busy indication), Internet Protocol Version 6 (IPv6) broadcast, and the like. Generally, IMS has a dedicated data channel (such as a Protocol Data Unit (PDU) session). When there is data in a data channel for the IMS, the type information of the corresponding service and/or data can be derived. The IMS includes at least one of the following: IMS voice, IMS short message, IMS signaling and so on.

4. Paging Rejection Function:

In an embodiment of the present application, that the network supports the paging rejection function may include at least one of the following: the network receives information for paging rejection sent by the terminal; and the network performs at least the following according to the information for paging rejection: stopping paging the terminal, discarding or suspending data about the terminal, and releasing the connection with the terminal.

In an embodiment of the present application, that the terminal supports the paging rejection function may include at least one of the following: the terminal sends information for paging rejection to the network. It is not difficult to understand that when the terminal does not intend to accept the received paging, the terminal supporting the paging rejection function may send information for paging rejection to the network.

5. Paging Restriction Function:

In an embodiment of the present application, the paging restriction function includes at least one of the following: a function of restricting paging (such as not sending the paging to the terminal), and a function of restricting (such as caching or discarding) data.

In some embodiments, that the terminal supports the paging restriction function includes at least one of the following: the terminal supports initiating a request to the network, where the request is used for one of the following: requesting paging restriction and requesting data restriction.

The data includes control plane data and/or user plane data.

In some embodiments, that the network supports the paging restriction function includes at least one of the following: the network supports restricting paging according to the request of the terminal, and restricting data according to the request of the terminal.

6. The Network Leaving Function

In an embodiment of the present application, the network leaving function includes at least one of the following: a function of releasing the connection between the terminal and the network, and a function of configuring the terminal in a disconnected state.

In some embodiments, that the terminal supports the network leaving function includes: initiating a request to the network, where the request is used for one of the following: the terminal supports requesting to leave the network, requesting to release the connection between the terminal and the network, and requesting to configure the terminal in a disconnected state.

In some embodiments, that the network supports the network leaving function includes: the network supports releasing the connection between the terminal and the network according to the request of the terminal, or configuring the terminal in a disconnected state.

In an embodiment of the present application, the information used to indicate the request to leave the network includes at least one of the following a request to release the connection between the terminal and the network, and a request to configure the terminal in a disconnected state.

7. Paging Conflict Avoidance Function

In an embodiment of the present application, that the terminal supports the paging conflict avoidance function includes: the terminal supports initiating a request to the network, where the request is used for one of the following: requesting to avoid paging conflict, requesting an offset of a user identifier, and requesting to update a user identifier.

In some embodiments, that the network supports the paging conflict avoidance function includes: the network supports configuring the offset of the user identifier or updating the user identifier according to the request of the terminal.

The user identifier includes at least one of the following: International Mobile Subscriber Identity (IMSI), Subscription Permanent Identifier (SUPI), Globally Unique Temporary Identifier (GUTI), 5th Generation Mobile Communication Technology (5G) GUTI (5G-GUTI).

The information processing method provided by the embodiment of the present application will be described in detail below through some embodiments and application scenarios with reference to the accompanying drawings.

Please refer to FIG. 2. FIG. 2 is a flowchart of an information processing method provided by an embodiment of the present application. The method is applied to a first communication device, and the first communication device includes but is not limited to: a CN network element (such as an AMF). As shown in FIG. 2, the method includes the following steps.

Step 21: In a case that a first condition is met, send, to a terminal, information indicating that a paging restriction function is supported.

In this embodiment, the first condition may include at least one of the following:

the terminal supports the paging restriction function; and a network supports the paging restriction function.

In one embodiment, when the terminal supports the paging restriction function and/or the network supports the paging restriction function, the AMF may send, to the terminal, information indicating that the paging restriction function is supported.

In some embodiments, the first condition may also include at least one of the following:

the terminal supports the network leaving function;

the terminal supports the paging rejection function;

the network supports the network leaving function; and the network supports the paging rejection function.

In an implementation manner, the terminal can only send paging restriction information to the network when the terminal requests to leave the network or the terminal sends information for paging rejection to the network. Therefore, the paging barring function needs to be attached to the network leaving function or the paging rejection function. It is not difficult to understand that, in sending, to the terminal, the information indicating that the paging restriction function is supported, in addition to considering that the terminal and/or the network supports the paging restriction function, it is also necessary to consider that the terminal and/or the network support the network leaving function, or, the terminal and/or the network supports the paging rejection function.

In another implementation manner, when the terminal supports the network leaving function and/or the terminal supports the paging rejection function, and the terminal supports the paging restriction function, the AMF may send, to the terminal, information indicating that the paging restriction function is supported.

In another implementation manner, when the terminal only supports the paging restriction function, the AMF cannot send, to the terminal, information indicating that the paging restriction function is supported.

It is not difficult to understand that through this embodiment of the present application, when the first condition is satisfied, the AMF may send, to the terminal, information indicating that the paging restriction function is supported, so as to realize the indication of supporting the paging restriction function.

Please refer to FIG. 3. FIG. 3 is a flowchart of an information processing method provided by an embodiment of the present application. The method is applied to a second communication device, and the second communication device includes but is not limited to: a CN network element (such as an AMF). As shown in FIG. 3, the method includes the following steps:

Step 31: Receive information indicating paging rejection or information indicating a request to leave a network.

Step 32: According to the information indicating paging rejection or the information indicating a request to leave a network, send, to an RAN network element, information indicating a request to release to a disconnected state.

In an implementation manner, the AMF may receive, from the terminal, the information used to indicate paging rejection or the information used to indicate a request to leave the network. Further, the AMF may receive, through a service request, a registration request, or a location update request, information indicating paging rejection or information indicating a request to leave the network from the terminal.

In some embodiments, the information indicating a request to release to a disconnected state may include at least one of the following: information indicating that the terminal is required to be switched to the disconnected state, information indicating that the connection between the terminal and the network is required to be set to the disconnected state, and the like.

In an implementation manner, the RAN network element may determine to release the terminal to the idle state or the inactive state according to the received information indicating a request to release to a disconnected state.

It is not difficult to understand that through the embodiment of the present application, after receiving the information indicating paging rejection, the AMF can send, to the RAN network element, the information indicating setting the disconnected state.

Please refer to FIG. 4. FIG. 4 is a flowchart of an information processing method provided by an embodiment of the present application. The method is applied to a third communication device, and the third communication device includes but is not limited to: a CN network element (such as an AMF). As shown in FIG. 4, the method includes the following steps.

Step 41: Obtain first information.

Step 42: Perform a first operation according to the first information.

In some embodiments, the first operation may include at least one of the following:

sending information indicating that a second function is not supported; and sending indication information indicating not sending a paging cause.

In some embodiments, the first information may be used to indicate at least one of the following the terminal enters a single-card mode, the terminal exits the multi-card mode, the terminal does not support a first function, and the terminal does not request or does not need the first function, and the like.

In some embodiments, the first function may include at least one of the following: a paging rejection function, a paging restriction function, a paging cause function, a network leaving function, and a paging conflict avoidance function, and the like.

In some embodiments, the second function may include at least one of the following: a paging rejection function, a paging restriction function, a paging cause function, a network leaving function, and a paging conflict avoidance function; and the second function is the same as or different from the first function.

In an implementation manner, the AMF may receive the first information from the UE.

In an implementation, the network leaving function includes at least one of the following: a function of releasing the connection between the terminal and the network, and a function of configuring the terminal in a disconnected state.

In some embodiments, the sending the information indicating that the second function is not supported may include: sending the information indicating that the network does not support the second function.

In some embodiments, the sending the information indicating that the second function is not supported may include: sending, to the terminal and/or the RAN network element, the information indicating that the second function is not supported.

In some embodiments, the sending the indication information indicating not sending a paging cause may include: sending, to the RAN network element, the indication information indicating not sending a paging cause.

In an implementation manner, when the first information is received, information indicating that the first function is not supported or indication information indicating the cause for not sending the paging is sent to the RAN network element. It is not difficult to understand that for a terminal in an inactive state, the RAN network element may not send a paging cause to the terminal according to the received information.

In some embodiments, the sending the information indicating that the second function is not supported includes at least one of the following in a case that the first information indicates that the terminal does not support the first function, and the first function includes at least one of a paging cause function and a paging rejection function, sending information indicating that the second function is not supported, where the second function includes a paging cause function; and in a case that the first information indicates that the terminal does not support the first function, and the first function includes at least one of the paging rejection function, the paging restriction function, and the network leaving function, sending information indicating that the second function is not supported, where the second function includes the paging restriction function.

It is not difficult to understand that through the embodiment of the present application, after receiving the first information, the AMF may send, to the terminal, information indicating that the second function is not supported, so as to realize the indication that the first function is not supported.

Please refer to FIG. 5. FIG. 5 is a flowchart of an information processing method provided by an embodiment of the present application. The method is applied to a fourth communication device, and the fourth communication device includes but is not limited to: a terminal. As shown in FIG. 5, the method includes the following step.

Step 51: In a case that a second condition is met, perform a second operation.

In some embodiments, the second operation may include at least one of the following:

setting a first function as not being supported, setting a multi-card mode to a single-card mode, or exiting the multi-card mode;

setting the first information; for example, setting that the first information indicates that the terminal does not support the first function; and sending the first information.

The first information may be used to indicate at least one of the following: the terminal enters a single-card mode, the terminal exits the multi-card mode, the terminal does not support a first function, and the terminal does not request or does not need the first function.

The first function may include at least one of the following: a paging rejection function, a paging restriction function, a paging cause function, a network leaving function, and a paging conflict avoidance function.

In some embodiments, the second condition may include at least one of the following:

The terminal enters the single-card mode; and the terminal exits the multi-card mode; and the terminal does not request or does not need the first function.

In an implementation manner, even if the terminal supports the first function, the terminal still sends the first information if the second condition is satisfied, for example, the first information indicates that the terminal does not support the first function.

It is not difficult to understand that through the embodiment of the present application, the indication of not supporting the first function can be implemented.

The following describes the embodiments of the present application in conjunction with specific application scenarios.

Embodiment 1

In Embodiment 1 of the present application, as shown in FIG. 6, the indication process for the paging restriction function may include the following steps:

Step 61: UE in an RRC connected state sends a registration request to a serving AMF. The registration request may include: the terminal supports the paging rejection function, and the terminal supports the paging restriction function; or the registration request may include: the terminal supports the network leaving function, and the terminal supports the paging restriction function.

Step 62: The serving AMF sends a registration response to the UE. The registration response may include: information indicating that the paging restriction function is supported.

For example, the registration response includes: information indicating that the network supports the paging restriction capability (NW Paging Restriction Capability).

Embodiment 2

In Embodiment 2 of the present application, as shown in FIG. 7, the process for connection release may include the following steps:

Step 71: UE in an RRC connected state sends a service request to a serving AMF, where the service request may include information indicating paging rejection.

Step 72: The serving AMF sends a UE context modification request to a Next Generation Radio Access Network (NG-RAN), where the UE context modification request may include a Paging Restriction (PR), which is used to indicate information (such as Release Indication) for setting of the disconnected state, or the like.

Step 73: The NG-RAN sends a UE context modification response to the serving AMF.

Step 74: Release an RRC connection between the UE and the network.

Step 75: The NG-RAN sends UE context release information to the serving AMF.

Step 76: Perform RRC release based on RRC inactive state configuration.

Step 77: Use PR to restrict paging in the RRC inactive state.

It should be noted that, the information processing method provided in the embodiment of the present application may be executed by an information processing apparatus, or a control module in the information processing apparatus for executing the information processing method. In the embodiment of the present application, the information processing apparatus provided in the embodiment of the present application is described by taking the information processing apparatus executing the information processing method as an example.

Figure 8:
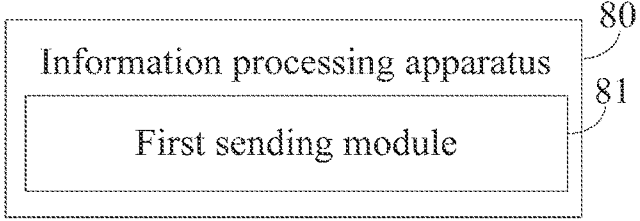
FIG. 8 is a schematic structural diagram of an information processing apparatus according to an embodiment of the present application.

Please refer to FIG. 8. FIG. 8 is a schematic structural diagram of an information processing apparatus provided by an embodiment of the present application, and the apparatus is applied to a first communication device, such as an AMF. As shown in FIG. 8, the information 15 processing apparatus 80 includes:

a first sending module 81, configured to: in a case that a first condition is met, send, to a terminal, information indicating that a paging restriction function is supported;

where the first condition includes at least one of the following:

the terminal supports the paging restriction function; and a network supports the paging restriction function.

It is understandable that the information processing apparatus 80 in the present application may further include a determining module, which is configured to determine whether the first condition is met or not.

In some embodiments, the first condition may also include at least one of the following:

the terminal supports the network leaving function;

the terminal supports the paging rejection function;

the network supports the network leaving function; and the network supports the paging rejection function.

In the embodiment of the present application, the information processing apparatus 80 can implement various processes implemented in the method embodiment shown in FIG. 2 of the present application, and achieve the same effect. To avoid repetition, details are not repeated here.

Figure 9:
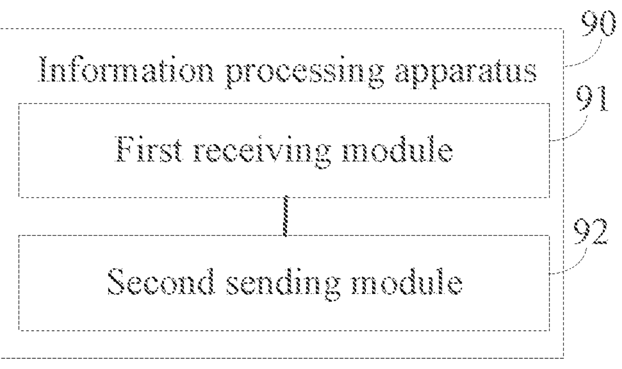
FIG. 9 is a schematic structural diagram of another information processing apparatus according to an embodiment of the present application.

Please refer to FIG. 9. FIG. 9 is a schematic structural diagram of an information processing apparatus provided by an embodiment of the present application, and the apparatus is applied to a second communication device, such as an AMF. As shown in FIG. 9, the information processing apparatus 90 includes. S a first receiving module 91, configured to receive information indicating paging rejection or information indicating a request to leave a network; and a second sending module 92, configured to: according to the information indicating paging rejection or the information indicating a request to leave a network, send, to an RAN network element, information indicating a request to release to a disconnected state.

In some embodiments, the information indicating a request to release to a disconnected state includes at least one of the following:

information indicating that the terminal is required to be switched to a disconnected state, and information indicating that the connection between the terminal and the network is required to be set to the disconnected state.

In the embodiment of the present application, the information processing apparatus 90 can implement various processes implemented in the method embodiment shown in FIG. 3 of the present application, and achieve the same effect. To avoid repetition, details are not repeated here.

Figure 10:
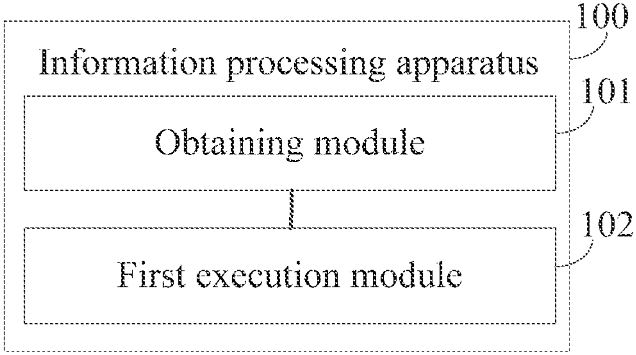
FIG. 10 is a schematic structural diagram of another information processing apparatus according to an embodiment of the present application.

Please refer to FIG. 10. FIG. 10 is a schematic structural diagram of an information processing apparatus provided by an embodiment of the present application, and the apparatus is applied to a third communication device, such as an AMF. As shown in FIG. 10, the information processing apparatus 100 includes:

an obtaining module 101, configured to obtain first information; and a first execution module 102, configured to perform a first operation based on the first information, where the first operation includes at least one of the following:

sending information indicating that a second function is not supported; and sending indication information indicating not sending a paging cause;

where the first information is used to indicate at least one of the following: the terminal enters a single-card mode, the terminal exits the multi-card mode, the terminal does not support a first function, and the terminal does not request or does not need the first function; and where the first function includes at least one of the following: a paging rejection function, a paging restriction function, a paging cause function, a network leaving function, and a paging conflict avoidance function;

the second function includes at least one of the following: a paging rejection function, a paging restriction function, a paging cause function, a network leaving function, and a paging conflict avoidance function; and the second function is the same as or different from the first function.

In some embodiments, the first execution module 102 is further configured to: according to the first information, send information indicating that the network does not support the second function.

In some embodiments, the first execution module 102 is further configured to: send, to the terminal and/or the RAN network element, the information indicating that the second function is not supported.

In some embodiments, the first execution module 102 is further configured to: send, to a RAN network element, indication information indicating not sending a paging cause.

In some embodiments, the first execution module 102 is also configured to execute at least one of the following:

in a case that the first information indicates that the terminal does not support the first function, and the first function includes at least one of a paging cause function and a paging rejection function, sending information indicating that the second function is not supported, where the second function includes a paging cause function; and in a case that the first information indicates that the terminal does not support the first function, and the first function includes at least one of the paging rejection function, the paging restriction function, and the network leaving function, sending information indicating that the second function is not supported, where the second function includes the paging restriction function.

In the embodiment of the present application, the information processing apparatus 100 can implement various processes implemented in the method embodiment shown in FIG. 4 of the present application, and achieve the same effect. To avoid repetition, details are not repeated here.

Figure 11:
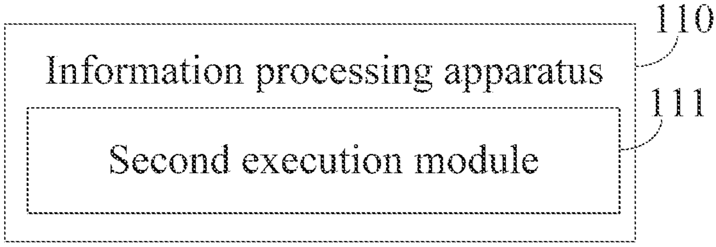
FIG. 11 is a schematic structural diagram of another information processing apparatus according to an embodiment of the present application.

Please refer to FIG. 11. FIG. 11 is a schematic structural diagram of an information processing apparatus provided by an embodiment of the present application, and the apparatus is applied to a fourth communication device, such as a terminal. As shown in FIG. 11, the information processing apparatus 110 includes:

a second execution module 111, configured to: in a case that a second condition is met, perform a second operation, where the second operation includes at least one of the following:

setting a first function as not being supported, setting a multi-card mode to a single-card mode, or exiting the multi-card mode;

setting the first information: for example, setting that the first information indicates that the terminal does not support the first function; and sending first information, where where the first information is used to indicate at least one of the following: the terminal enters a single-card mode, the terminal exits the multi-card mode, the terminal does not support a first function, and the terminal does not request or does not need the first function; and the first function includes at least one of the following: a paging rejection function, a paging restriction function, a paging cause function, a network leaving function, and a paging conflict avoidance function.

It is understandable that the information processing apparatus 110 in the present application may further include a determining module, which is configured to determine whether the second condition is met or not.

In some embodiments, the second condition includes at least one of the following:

the terminal enters the single-card mode;

the terminal exits the multi-card mode; and the terminal does not request or does not need the first function.

In the embodiment of the present application, the information processing apparatus 110 can implement various processes implemented in the method embodiment shown in FIG. 5 of the present application, and achieve the same effect. To avoid repetition, details are not repeated here.

Figure 12:
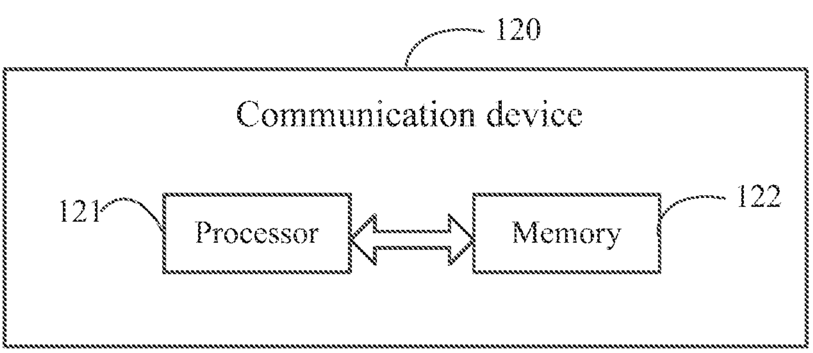
FIG. 12 is a structural diagram of a communication device according to an embodiment of the present application.

For example, as shown in FIG. 12, the embodiment of the present application also provides a communication device 120, including a processor 121, a memory 122, and programs or instructions stored in the memory 122 and operable on the processor 121, when the program or instruction is executed by the processor 121, the various processes of the above-mentioned method embodiment shown in FIG. 2 can be realized, or the various processes of the above-mentioned method embodiment shown in FIG. 3 can be realized, or the various processes of the above-mentioned method embodiment shown in FIG. 4 can be realized, or the various processes of the above-mentioned method embodiment shown in FIG. 5 can be realized, can achieve the same technical effect. To avoid repetition, details are not repeated here.

An embodiment of the present application further provides a readable storage medium. A program or an instruction is stored in the readable storage medium. When the program or the instruction is executed by a processor, processes of the embodiment of the information processing method can be implemented, and a same technical effect can be achieved. To avoid repetition, details are not described herein.

The processor is a processor in the terminal in the foregoing embodiment. The readable storage medium includes a computer-readable storage medium, such as a computer Read-only Memory (ROM), a Random Access Memory (RAM), a magnetic disk, or an optical disc.

An embodiment of the present application further provides a chip. The chip includes a processor and a communication interface, the communication interface is coupled to the processor, and the processor is configured to run a program or an instruction to implement processes of the embodiment of the information processing method, and a same technical effect can be achieved. To avoid repetition, details are not described herein again.

It should be understood that the chip mentioned in this embodiment of the present application may also be referred to as a system-level chip, a system chip, a chip system, or an on-chip system chip.

It should be noted that, in this specification, the term “include”, “comprise”, or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by “includes a . . . ” does not, without more constraints, preclude the presence of additional identical elements in the process, method, article, or apparatus that includes the element. In addition, it should be noted that the scope of the method and the apparatus in the embodiments of the present application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of the present application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network side device, or the like) to perform the methods described in the embodiments of the present application.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. An information processing method, performed by a communication device, comprising:

when a first condition is met, sending, to a terminal, information indicating that a paging restriction function is supported, wherein the first condition comprises at least of the following:

that the terminal supports the paging restriction function, that a network supports the paging restriction function;

wherein the first condition further comprises at least of the following:

that the terminal supports the network leaving function;

that the terminal supports the paging rejection function;

that the network supports the network leaving function; or that the network supports the paging rejection function; and according to information indicating paging rejection or information indicating a request to leave a network, sending, to a Radio Access Network (RAN) network element, information indicating a request to release to a disconnected state.

2. The information processing method according to claim 1, further comprising: receiving information indicating paging rejection or information indicating a request to leave a network.

3. The information processing method according to claim 1, wherein the information indicating a request to release to a disconnected state comprises at least one of the following:

information indicating that a terminal is required to be switched to a disconnected state; or information indicating that the connection between the terminal and the network is required to be set to the disconnected state.

4. The information processing method according to claim 1, further comprising:

obtaining first information; and performing a first operation based on the first information, wherein the first operation comprises at least one of the following:

sending information indicating that a second function is not supported; or sending indication information indicating not sending a paging cause, wherein:

the first information is used to indicate at least one of the following: that the terminal enters a single-card mode, that the terminal exits the multi-card mode, that the terminal does not support a first function, or that the terminal does not request or does not need the first function;

the first function comprises at least one of the following: a paging rejection function, a paging restriction function, a paging cause function, a network leaving function, or a paging conflict avoidance function;

the second function comprises at least one of the following: a paging rejection function, a paging restriction function, a paging cause function, a network leaving function, or a paging conflict avoidance function; and the second function is the same as or different from the first function.

5. The information processing method according to claim 4, wherein the sending the information indicating that the second function is not supported comprises:

sending information indicating that the network does not support the second function.

6. The information processing method according to claim 4, wherein the sending the information indicating that the second function is not supported comprises: sending, to the terminal or a Radio Access Network (RAN) network element, the information indicating that the second function is not supported; and the sending the indication information indicating not sending a paging cause comprises: sending, to the RAN network element, the indication information indicating not sending a paging cause.

7. The information processing method according to claim 4, wherein the sending the information indicating that the second function is not supported comprises at least one of the following:

when the first information indicates that the terminal does not support the first function, and the first function comprises at least one of a paging cause function or a paging rejection function, sending information indicating that the second function is not supported, wherein the second function comprises a paging cause function; or when the first information indicates that the terminal does not support the first function, and the first function comprises at least one of the paging rejection function, the paging restriction function, or the network leaving function, sending information indicating that the second function is not supported, wherein the second function comprises the paging restriction function.

8. An information processing apparatus, comprising:

a first sending module, configured to:

in a case that a first condition is met, send, to a terminal, information indicating that a paging restriction function is supported, wherein the first condition comprises at least of the following:

that the terminal supports the paging restriction function, that a network supports the paging restriction function;

wherein the first condition further comprises at least of the following:

that the terminal supports the network leaving function;

that the terminal supports the paging rejection function;

that the network supports the network leaving function; or that the network supports the paging rejection function; and according to information indicating paging rejection or information indicating a request to leave a network, sending, to a Radio Access Network (RAN) network element, information indicating a request to release to a disconnected state.

9. The information processing apparatus according to claim 8, further comprising: a first receiving module configured to receive information indicating paging rejection or information indicating a request to leave a network.

10. The information processing apparatus according to claim 8, wherein the information indicating a request to release to a disconnected state comprises at least one of the following:

information indicating that a terminal is required to be switched to a disconnected state; or information indicating that the connection between the terminal and the network is required to be set to the disconnected state.

11. The information processing apparatus according to claim 8, further comprising:

an obtaining module, configured to obtain first information; and a first execution module, configured to perform a first operation based on the first information, wherein the first operation comprises at least one of the following:

sending information indicating that a second function is not supported; or sending indication information indicating not sending a paging cause, wherein:

the first information is used to indicate at least one of the following: that the terminal enters a single-card mode, that the terminal exits the multi-card mode, that the terminal does not support a first function, or that the terminal does not request or does not need the first function;

the first function comprises at least one of the following: a paging rejection function, a paging restriction function, a paging cause function, a network leaving function, or a paging conflict avoidance function;

the second function comprises at least one of the following: a paging rejection function, a paging restriction function, a paging cause function, a network leaving function, or a paging conflict avoidance function; and the second function is the same as or different from the first function.

12. The information processing apparatus according to claim 11, wherein the sending the information indicating that the second function is not supported comprises:

sending information indicating that the network does not support the second function.

13. The information processing apparatus according to claim 11, wherein the sending the information indicating that the second function is not supported comprises: sending, to the terminal or a Radio Access Network (RAN) network element, the information indicating that the second function is not supported; and the sending the indication information indicating not sending a paging cause comprises: sending, to the RAN network element, the indication information indicating not sending a paging cause.

14. The information processing apparatus according to claim 11, wherein the sending the information indicating that the second function is not supported comprises at least one of the following:

when the first information indicates that the terminal does not support the first function, and the first function comprises at least one of a paging cause function or a paging rejection function, sending information indicating that the second function is not supported, wherein the second function comprises a paging cause function; or when the first information indicates that the terminal does not support the first function, and the first function comprises at least one of the paging rejection function, the paging restriction function, or the network leaving function, sending information indicating that the second function is not supported, wherein the second function comprises the paging restriction function.

15. A non-transitory computer-readable storage medium storing instructions that, when executed by a processor, cause the processor to perform operations comprising:

when a first condition is met, sending, to a terminal, information indicating that a paging restriction function is supported, wherein the first condition comprises at least one of the following:

that the terminal supports the paging restriction function, or that a network supports the paging restriction function;

wherein the first condition further comprises at least one of the following:

that the terminal supports the network leaving function;

that the terminal supports the paging rejection function;

that the network supports the network leaving function; or that the network supports the paging rejection function; and according to information indicating paging rejection or information indicating a request to leave a network, sending, to a Radio Access Network (RAN) network element, information indicating a request to release to a disconnected state.

16. The non-transitory computer-readable storage medium according to claim 15, wherein the operations further comprise:

receiving information indicating paging rejection or information indicating a request to leave a network.

17. The non-transitory computer-readable storage medium according to claim 15, wherein the information indicating a request to release to a disconnected state comprises at least one of the following:

information indicating that a terminal is required to be switched to a disconnected state; or information indicating that the connection between the terminal and the network is required to be set to the disconnected state.

18. The non-transitory computer-readable storage medium according to claim 15, wherein the operations further comprise:

obtaining first information; and performing a first operation based on the first information, wherein the first operation comprises at least one of the following:

sending information indicating that a second function is not supported; or sending indication information indicating not sending a paging cause, wherein:

the first information is used to indicate at least one of the following: that the terminal enters a single-card mode, that the terminal exits the multi-card mode, that the terminal does not support a first function, or that the terminal does not request or does not need the first function;

the first function comprises at least one of the following: a paging rejection function, a paging restriction function, a paging cause function, a network leaving function, or a paging conflict avoidance function;

the second function comprises at least one of the following: a paging rejection function, a paging restriction function, a paging cause function, a network leaving function, or a paging conflict avoidance function; and the second function is the same as or different from the first function.

19. The non-transitory computer-readable storage medium according to claim 18, wherein the sending the information indicating that the second function is not supported comprises:

sending information indicating that the network does not support the second function.

20. The non-transitory computer-readable storage medium according to claim 18, wherein the sending the information indicating that the second function is not supported comprises: sending, to the terminal or a Radio Access Network (RAN) network element, the information indicating that the second function is not supported; and the sending the indication information indicating not sending a paging cause comprises: sending, to the RAN network element, the indication information indicating not sending a paging cause.

* * * * *